United States Patent
Bank et al.

(10) Patent No.: US 8,220,785 B2
(45) Date of Patent: Jul. 17, 2012

(54) ROLLING-LOBE AIR SPRING HAVING A DROP BASE RING CLAMP CONTOUR

(75) Inventors: Christoph Bank, Lehrte (DE); Paul Cerny, Wennigsen (DE); Hubertus Gawinski, Lauenau (DE)

(73) Assignee: ContiTech Luftfedersteme GmbH, Hannover (DE)

( * ) Notice: Subject to any disclaimer, the term of this patent is extended or adjusted under 35 U.S.C. 154(b) by 966 days.

(21) Appl. No.: 11/791,211

(22) PCT Filed: Oct. 7, 2005

(86) PCT No.: PCT/EP2005/010789
§ 371 (c)(1),
(2), (4) Date: May 22, 2007

(87) PCT Pub. No.: WO2006/056267
PCT Pub. Date: Jun. 1, 2006

(65) Prior Publication Data
US 2008/0290570 A1    Nov. 27, 2008

(30) Foreign Application Priority Data
Nov. 24, 2004   (DE) .................. 10 2004 056 517

(51) Int. Cl.
*F16F 9/04* (2006.01)
(52) U.S. Cl. .................................... 267/64.27
(58) Field of Classification Search ............ 267/64.21, 267/64.24, 64.27
See application file for complete search history.

(56) References Cited

U.S. PATENT DOCUMENTS

| | | | | |
|---|---|---|---|---|
| 4,657,229 A | * | 4/1987 | Thurow | 267/64.27 |
| 4,793,598 A | | 12/1988 | Geno et al. | |
| 5,005,808 A | | 4/1991 | Warmuth, II et al. | |
| 5,566,929 A | * | 10/1996 | Thurow | 267/64.24 |
| 6,036,180 A | | 3/2000 | Ecktman | |

FOREIGN PATENT DOCUMENTS

| | | |
|---|---|---|
| DE | 36 43 073 | 6/1988 |
| DE | 41 42 561 | 7/1993 |
| EP | 1 464 866 A2 | 10/2004 |
| JP | 60044630 A * | 3/1985 |

* cited by examiner

*Primary Examiner* — Robert A Siconolfi
*Assistant Examiner* — Stephen Bowes
(74) *Attorney, Agent, or Firm* — Walter Ottesen (57) ABSTRACT

A flexible member air spring has an end section of the flexible member attached to a connecting part by a clamp ring. The connecting part has a slot having a truncated cone-shaped cross section. The base of the slot is cylindrical and a flank of the slot has a linear conical form. The inner surface of the clamp ring extends parallel to the base surface. In the clamped state, the inner radius of the clamp ring is less than or equal to at least one of the radii of the slot upper edges. The flexible member is not compressed between the base surface of the slot and the inner side of the clamp ring. The clamp ring, with at least one slot flank, forms a constriction clamping the flexible member wall of the end section.

11 Claims, 5 Drawing Sheets

ROLLING-LOBE AIR SPRING HAVING A DROP BASE RING CLAMP CONTOUR

RELATED APPLICATION

This application is the national stage of PCT/EP 2005/010789, filed Oct. 7, 2005, designating the United States and claiming priority from German patent application no. 10 2004 056 517.1, filed Nov. 24, 2004, the entire contents of which are incorporated herein by reference.

FIELD OF THE INVENTION

The invention relates to a rolling-lobe air spring and especially the attachment of a rolling-lobe flexible member to a connecting part (air spring cover and/or roll-off piston). The connecting part is to be applied pressure tight at the ends to the flexible member with each end being form tight and pull tight.

BACKGROUND OF THE INVENTION

Figure 4:
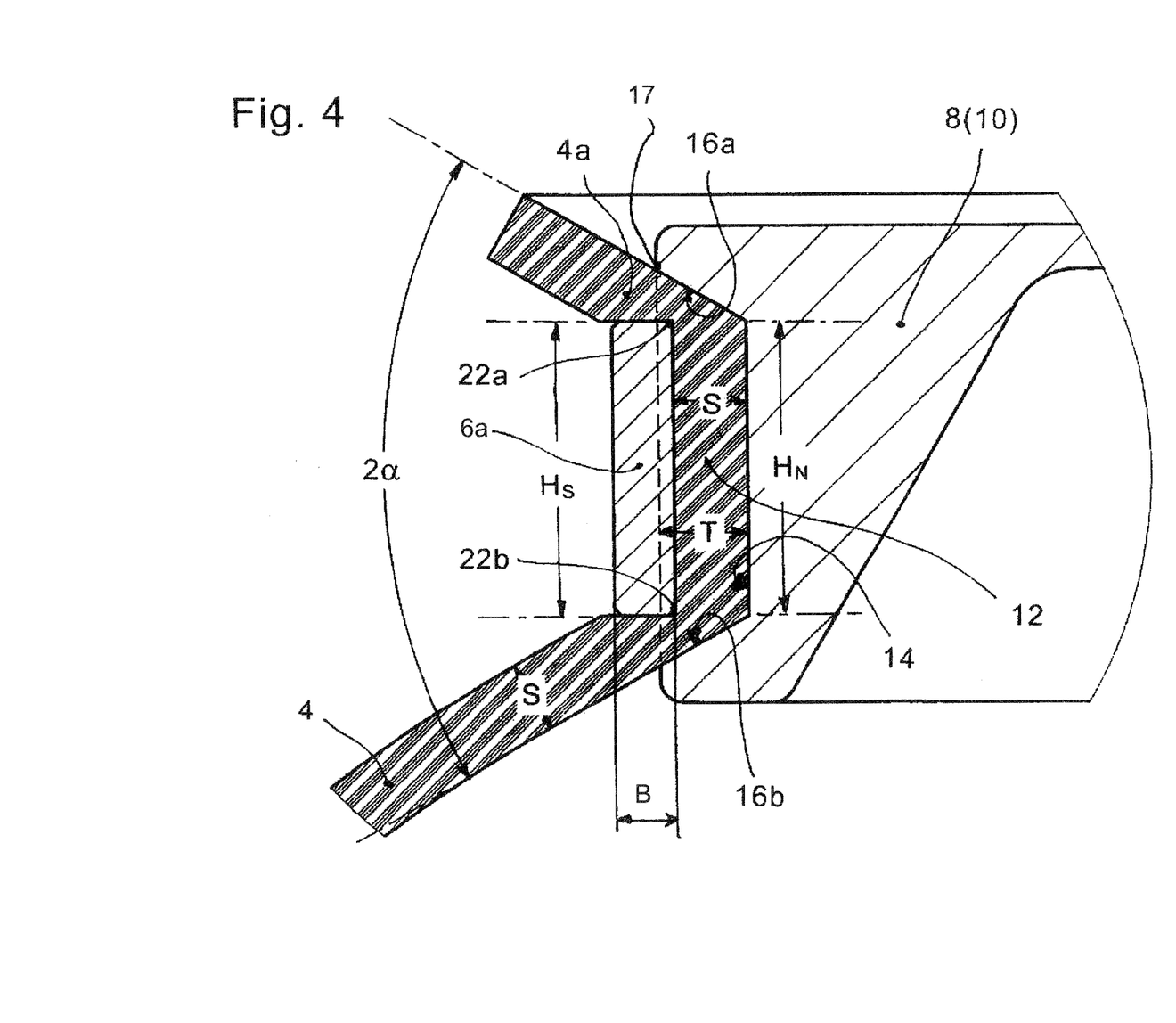
FIG. 4 shows the detail of a connecting part/rolling-lobe flexible member end/clamp ring (likewise in longitudinal section); and, FIGS. 5 to 7 show different configurations of the slot according to the invention.

U.S. Pat. No. 5,005,808 is directed to the end attachment of an air spring flexible member to respective connecting parts. FIG. 4 shows all essential details. The attachment part includes a slot for attaching a sleeve rolling-lobe flexible member end section. This slot has a base surface which can be provided with peripherally-extending grooves 24. The flanks of the slot are partially curved and partially conically inclined at different angles $\alpha$ and $\beta$. The clamping takes place via the compression of the flexible member over the entire elevation of the clamp ring. The elastomeric material of the flexible member is practically incompressible. For this reason, the clamping over the entire clamp ring elevation $h_R$ has the consequence that, to a considerable extent, elastomeric material is squeezed out at both sides of the clamp ring in the longitudinal direction of the flexible member. In view of the fact that the flexible member is provided with a reinforcement, which is expandable slightly compared to the rubber, the problem is present that the considerable longitudinal displacement of the elastomeric material can lead to unwanted excessive longitudinal stresses within the flexible member and therefore to a possible separation of the elastomeric material from the reinforcement which can expand only slightly.

In order to avoid internal longitudinal stresses of the above kind in the clamping region of the flexible member, DE 41 42 561 A1 suggests that the end section of the flexible member not be pressed over the entire elevation of the clamp ring and instead only at an upper and/or lower "constriction" in the region of at least one of the flanks of the attachment slot. FIG. 4 shows the "constriction" 21 at the lower slot flank 22 while the flexible member is practically not compressed over the entire clamping elevation of the clamp ring. Because of the rectangular slot cross section in the construction shown in FIG. 4, the insertion of the clamp ring, which is to be mounted, is not easily possible.

Figure 1:
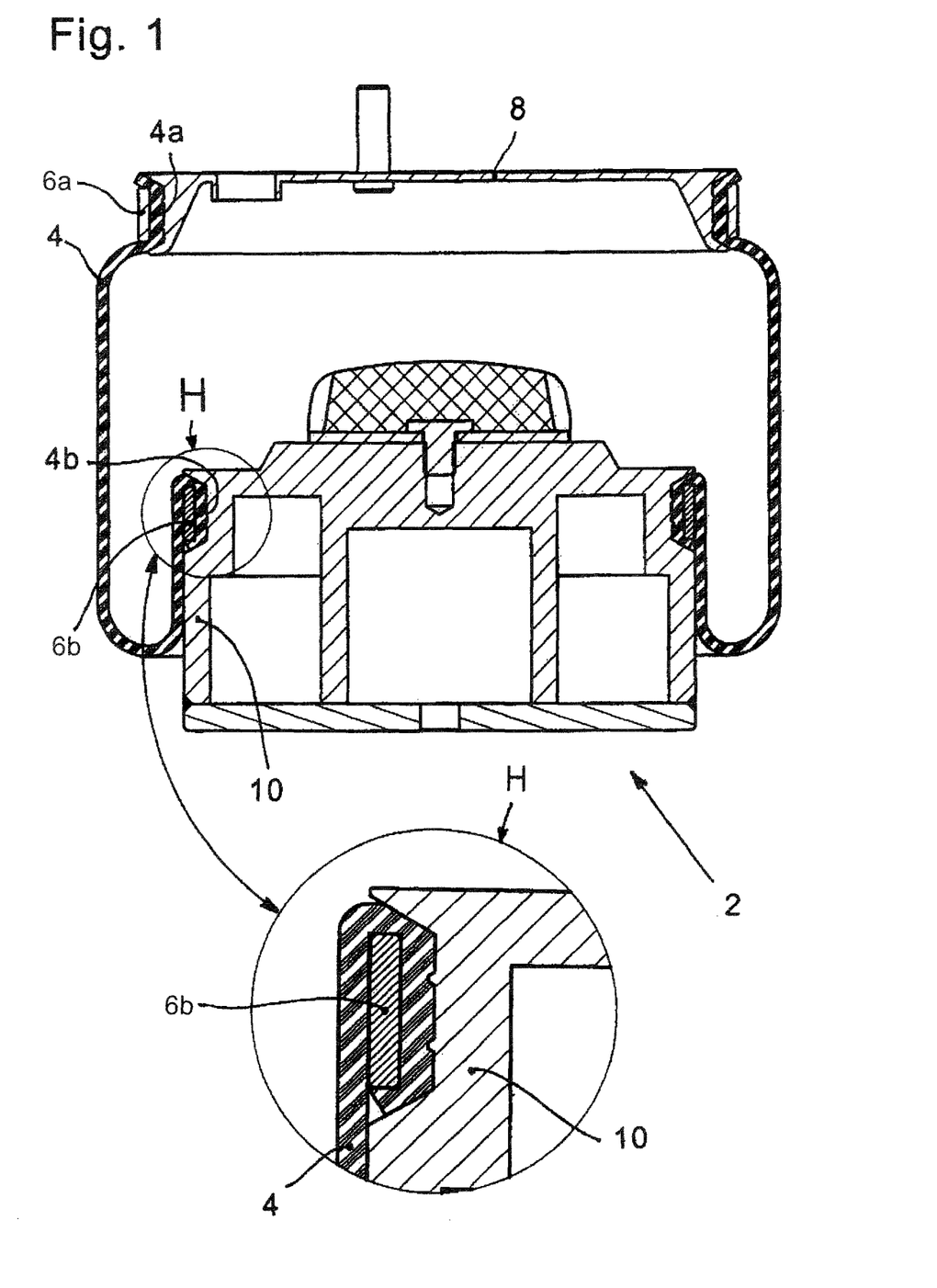
FIG. 1 shows the longitudinal section (axial section) through a sleeve rolling-lobe flexible member air spring having rolling-lobe flexible member ends attached in accordance with the invention.

An easier assembly possibility is to be expected by the variation shown in FIG. 1. Here too, the basic idea of the flexible member attachment is that no compression is present over the elevation of the clamping length and therefore no greater material displacement is present in the longitudinal direction of the flexible member; instead, the basic idea of the flexible member attachment is rather that the clamping takes place only at short "constrictions" 21 in the region of the slot flanks. The rounded clamp geometry includes no gripping capacity. Accordingly, with respect to the construction shown in FIG. 1, the desired pull-out strength does not appear to be satisfied especially to the extent as is required in commercial vehicles.

SUMMARY OF THE INVENTION

The task of the present invention is therefore a reliable attachment of a sleeve rolling-lobe flexible member to a connecting part. A longitudinal displacement of elastomeric material relative to the reinforcement, which is integrated therein, is substantially avoided.

The solution of this task is especially a configuration of at least one clamp "constriction" which is, on the one hand, more effective and, on the other hand, easier to assemble.

The plastically deformable clamp ring is radially pressed. Because of the conical configuration of the slot flanks, a self-adjusting clamping of the sleeve rolling-lobe flexible member end regions disposed in each case between the slot and the clamp ring results. The section of the sleeve rolling-lobe flexible member end region, which is disposed between the clamp ring inner surface and the base of the slot, is only minimally clamped, that is, it is only minimally pressed by the amount which the incompressibility of the wall of the flexible member permits.

The sleeve rolling-lobe flexible member is, as a practical matter, not pressed over the entire clamp ring elevation which corresponds approximately to the elevation of the base of the slot and this has the consequence that no material is displaced in the longitudinal direction of the sleeve rolling-lobe flexible member. A separation of the reinforcement, which is integrated in the elastomeric material of the flexible member, is therefore not to be feared. A clamping is only pointwise, namely, at an upper "constriction" and a lower "constriction". The clamping realized here is so effective because a linear surface (slot flank) and a wedge-shaped edge (of the clamp ring) lie opposite each other as clamp jaws. Because of the shortness of the constriction, there is no significant longitudinal displacement of the elastomeric material. Here too, a separation of the elastomeric material from the reinforcement is not to be feared. The reinforcement is integrated into the sleeve rolling-lobe flexible member.

A one-end drop-base contour (FIG. 7) is sufficient to hold the flexible member for clamping where the load is not too great.

The flexible member is compressed at the clamp point to approximately 45% to 65% of its thickness because of the geometric relationships (slot base elevation≅clamp ring elevation and opening angle ($\alpha$) between perpendicular and flank direction $\alpha=25°$ to $35°$) (for simple conical flanks) or $2\alpha=50°$ to $70°$ (in the event that both flanks are conically inclined).

Figure 5:
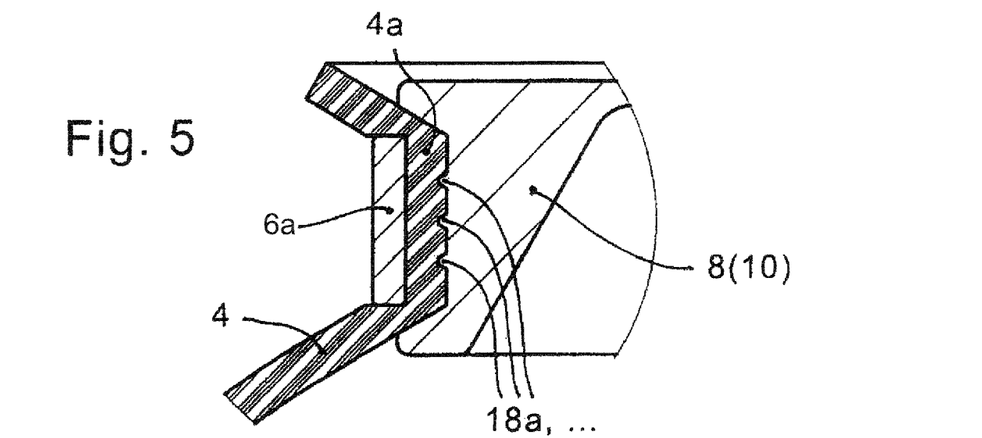
Figure 6:
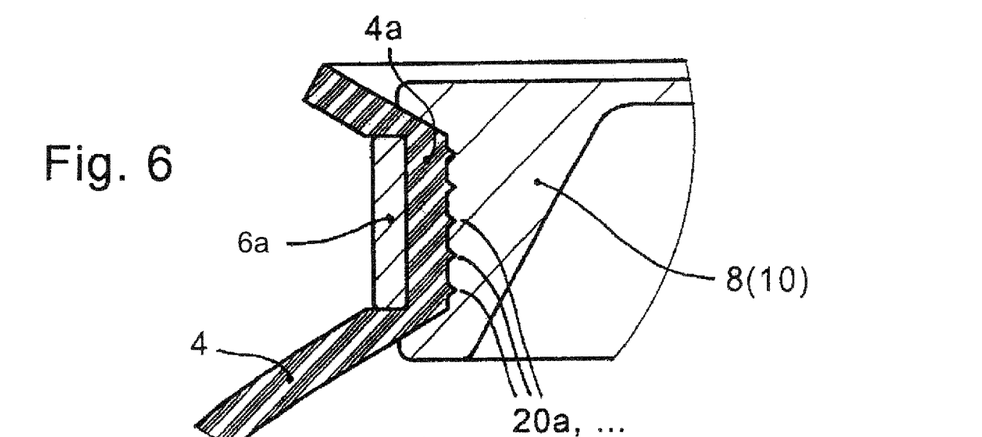

To satisfy higher sealing requirements and in order to achieve a further increase of the tear out strength, it can be purposeful to provide the drop base with a circular profile (multi-tooth surface, FIG. 5, or a slotted surface, FIG. 6). In this way, there results an air spring clamping which can be overall subjected to greater load.

If the inner edges of the clamp ring are slightly rounded or the inner edges are provided with a bevel, then a tearing through of the flexible member at the clamping point is reliably avoided.

The configuration according to the invention of the drop base clamping is also suitable without difficulty for so-called folded-over sleeve rolling-lobe flexible members or sleeve rolling-lobe flexible member ends.

The drop base clamping of the sleeve rolling-lobe flexible member according to the invention can be intensely loaded and is most reliable. For this reason, the drop base clamping can preferably be used for commercial vehicles (trucks and busses).

Overall, sleeve rolling-lobe flexible member air springs having the drop base clamping according to the invention define a cost effective alternative to rolling-lobe flexible member air springs having ring-reinforced beads on conical sealing surfaces of the attachment parts.

BRIEF DESCRIPTION OF THE DRAWINGS

The invention will now be described with reference to the drawings wherein.

DESCRIPTION OF THE PREFERRED EMBODIMENTS OF THE INVENTION

Figure 2:
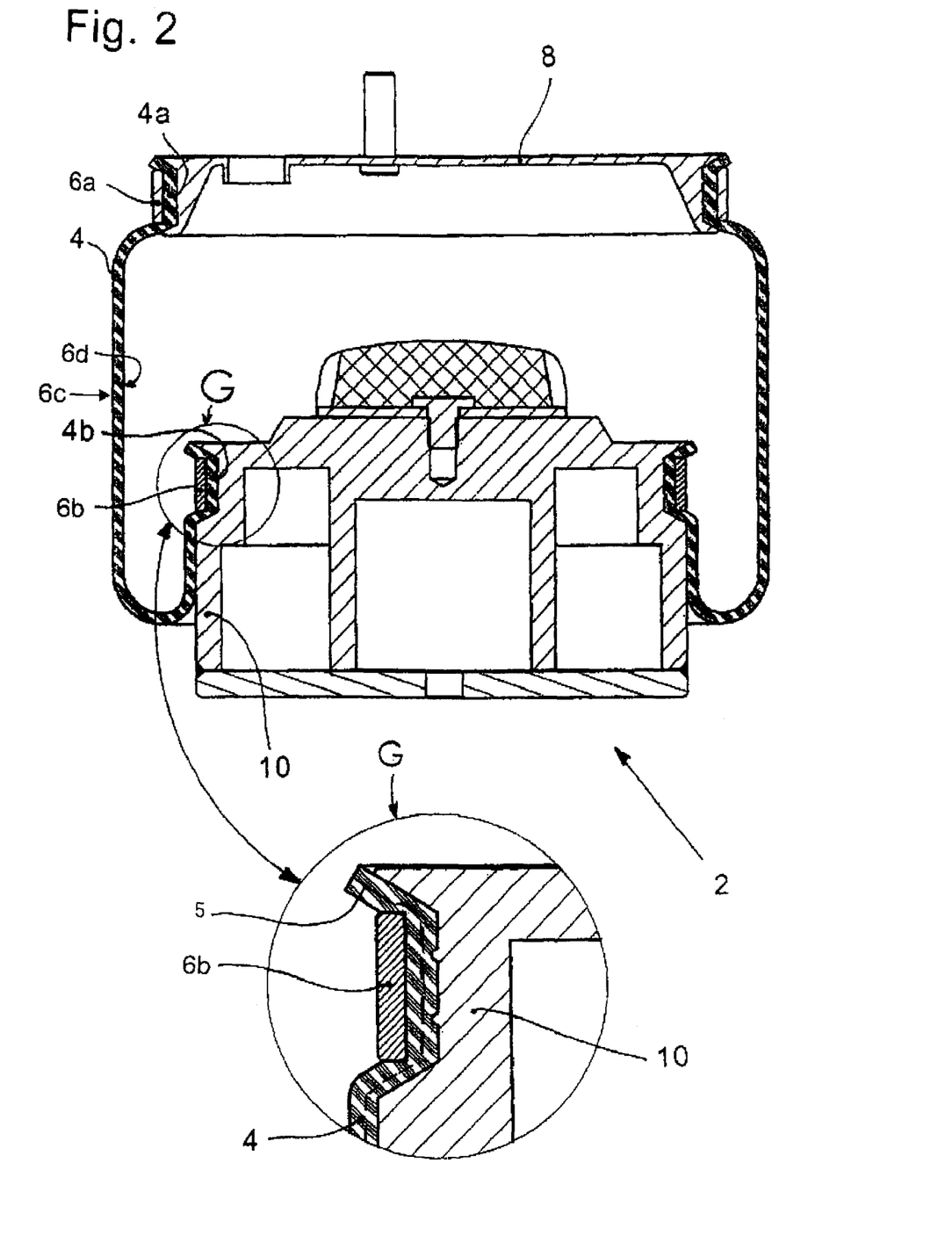
FIG. 2 likewise shows the longitudinal section through a sleeve rolling-lobe flexible member air spring with the piston end rolling-lobe flexible member end being folded over in advance of assembly.

The air springs 2 shown in FIGS. 1 and 2 comprise essentially a sleeve rolling-lobe flexible member 4 having end sections (4a, 4b) which are applied form tight, pull tight and pressure tight to respective connecting parts (8, 10). As shown in FIG. 2, reinforcement 5 is integrated into the sleeve rolling-lobe flexible member 4. The upper connecting part 8 is, in each case, an air spring cover while the lower connecting part 10 is, in each case, a roll-off piston. Each of the connecting parts (8, 10) has a specially formed slot 12 for attaching corresponding ends (4a, 4b) of the sleeve rolling-lobe flexible member. End section 4a or 4b of a sleeve rolling-lobe member 4 is placed in corresponding slots 12 and clamped with the aid of a corresponding clamp ring (6a, 6b). Because of the plastic deformation of the clamp ring (6a, 6b), the sleeve rolling-lobe flexible member 4 is pressed into the slot 12 which extends peripherally around each connecting part 8 and/or 10 and is configured as a drop-base contour.

The air spring 2 shown in FIG. 2 distinguishes from the air spring 2 of FIG. 1 in that here the sleeve rolling-lobe flexible member 4 has first been folded over for the purpose of attachment at the roll-off piston 10. In this way, the outer side 6c of the corresponding sleeve rolling-lobe flexible member end 4b comes to rest at the contact surface of the slot 12 of the roll-off piston 10; whereas, the inner side 6d of the end 4b of the sleeve rolling-lobe flexible member comes in contact against the inner side of the clamp ring 6b.

The advantage of the attachment of a sleeve rolling-lobe flexible member 4 or sleeve rolling-lobe flexible member end 4a or 4b, which has been folded over in advance, is that a deflection is possible without difficulty also in the completely pressureless state of the air spring 2. A buckling and therefore damage of the sleeve rolling-lobe flexible member 4 is reliably avoided.

Figure 3:
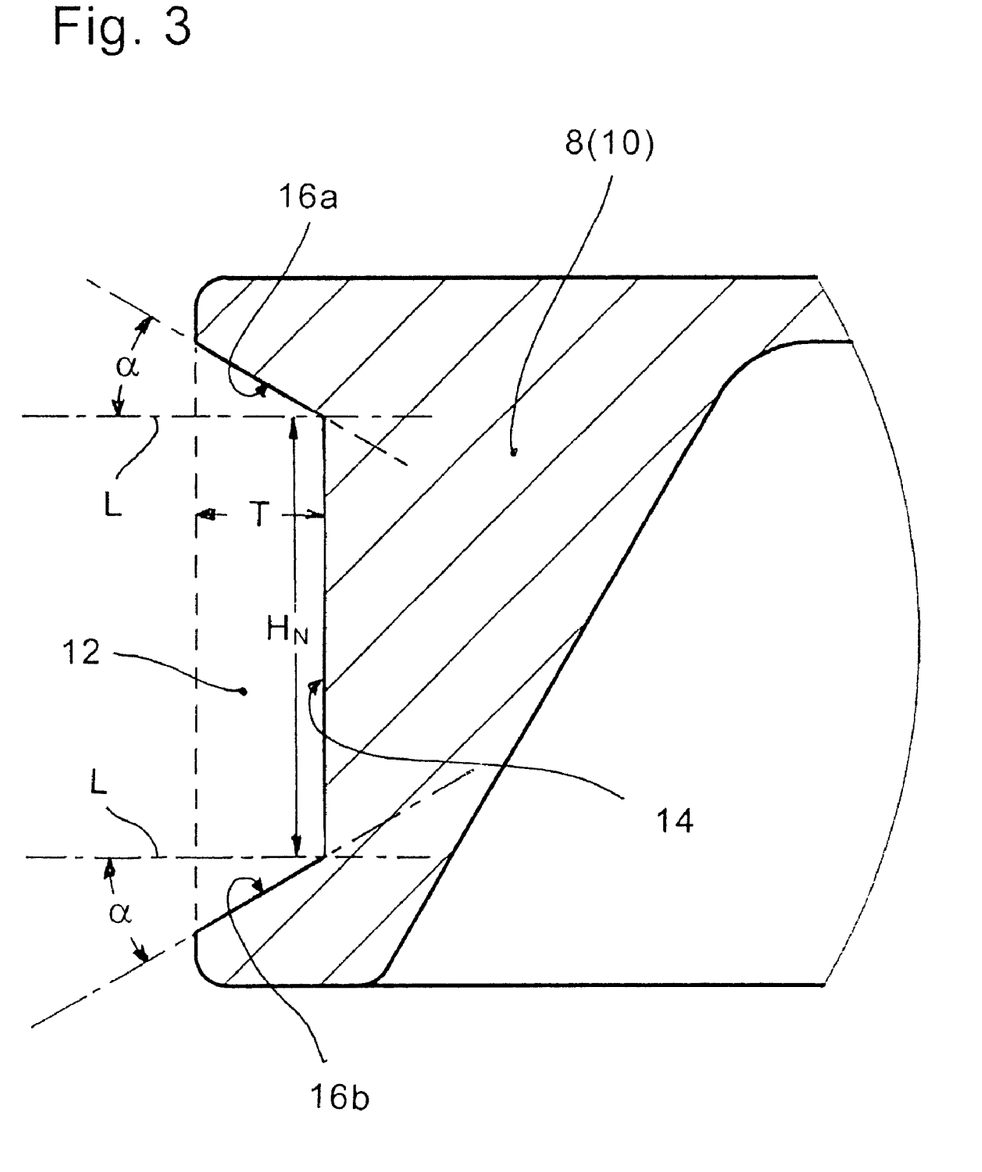
FIG. 3 shows the section of the connecting part (in longitudinal section) referred to the attachment slot.

FIG. 3 shows details of the slot 12 disposed in the connecting part (8, 10) (cover 8 and/or roll-off piston 10). The slot 12 has a cross section shaped as a truncated cone having a straight line base 14 of elevation $H_N$ and linearly beveled side flanks (16a, 16b). The two side flanks (16a, 16b) are each inclined at an angle α relative to the perpendicular L so that the slot 12 is wider at its opening than at its base 14. The depth of the slot 12 is identified by T.

As shown in FIG. 4, the depth T of the slot 12 is greater than the thickness S of the sleeve rolling-lobe flexible member 4. In this way, the inner side of the clamp ring (6a, 6b) comes to lie below the upper edges of the slot flanks (16a, 16b). The spacing from the bottom 14 of the drop base to the clamp ring (6a, 6b) corresponds approximately to the wall thickness S of the sleeve rolling-lobe flexible member 4. The clamp ring (6a, 6b) is provided with bevels (0.5×45°) at its peripheral edges in order to avoid damage to the wall of the flexible member. The depth of the slot 12 should be approximately (flexible member wall thickness+½ clamp ring width B) in order to avoid a pull-off of the clamp ring (6a, 6b). The reduction of the flexible member wall thickness S in the region of the clamp ring edges can be varied by the press-in depth and elevation of the clamp (ring 6a, 6b) as well as a variation of the flank angle α of the drop-base contour 12. Depending upon the configuration of the flexible member wall and the requirements on the clamping, the optimal flexible member wall thickness reduction can lie at 30% to 75% of the wall thickness S of the flexible member.

In addition, FIG. 4 shows that the clamp ring elevation $H_S$ corresponds approximately to elevation $H_N$ of the slot base 14.

From the geometric relationships shown, the clamping according to the invention has two "constrictions", namely, between the upper and lower inner edges of the clamp ring (6a, 6b) on the one hand and the respective flanks 16a and 16b of the slot 10 on the other hand. In this way, a point compression of the flexible member 4 is approximately 50% of its thickness S.

(A two point compression can be seen only in the cross-sectional view. Actually, a two-fold circular compression takes place along the inner upper edge and the inner lower edge of the circularly-shaped clamp ring (6a, 6b).)

Figure 7:
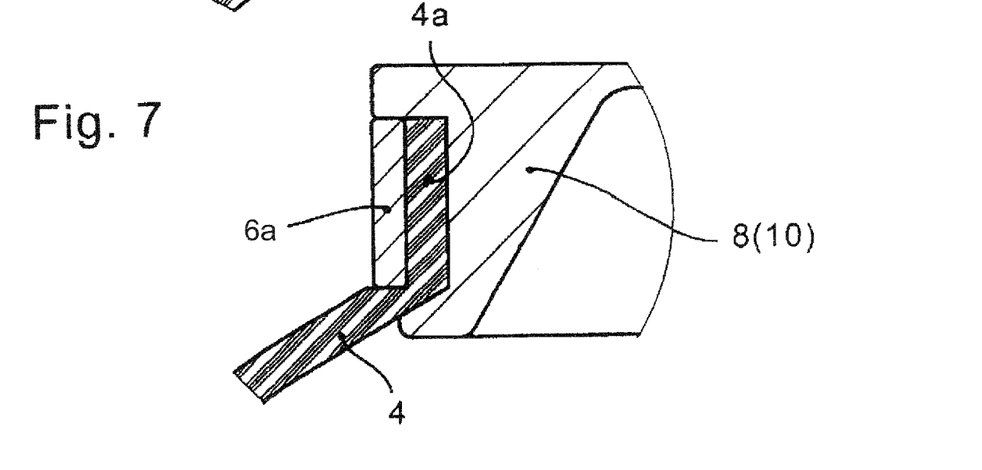

FIGS. 5 to 7 show specific embodiments of the sleeve rolling-lobe flexible member clamping. According to FIG. 5, the slot base 14 has risers (18a, 18b, . . . ) which are peripherally arranged on the cylindrical slot surface.

According to FIG. 6, peripherally-extending recesses (20a, 20b, . . . ) are provided on the slot base 14.

FIG. 7 shows a one-sided clamping of a sleeve rolling-lobe flexible member end (4a or 4b); that is, the slot flank beveling provided by the invention is configured only at a single slot flank 16a whereas the other slot flank 16b is at right angles and does not contribute to clamping the sleeve rolling-lobe flexible member end 4a or 4b.

REFERENCE NUMERAL LIST

2 Sleeve rolling-lobe flexible member air spring
4 Sleeve rolling-lobe flexible member
4a, 4b End sections, end regions of the sleeve rolling-lobe flexible member
6a, 6b Clamp rings
6c Outer side of the rolling-lobe flexible member
6d Inner side of the rolling-lobe flexible member 4
6a Inner side of the rolling-lobe flexible member 4
8, 10 Connecting parts
8 Air spring cover
10 Roll-off piston
12 Attachment slot in the connecting part 8 and/or 10, slot, drop-base contour
14 Base, bottom of the drop base, base of the slot
16a, 16b Flanks of the slot
α Opening angle of a flank
L Vertical
$H_N$ Elevation of the slot T Depth of the slot
$H_S$ Elevation of the clamp ring
B Clamp ring width
S Thickness of the sleeve rolling-lobe flexible member
17 Slot upper edge
18a, 18b, . . . Risers in the base of the slot
20a, 20b, . . . Recesses in the base of the slot
22a, 22b Inner edges of the clamp ring

The invention claimed is:

1. An air spring comprising:
a sleeve rolling-lobe flexible member made of elastomeric material and incorporating a reinforcement and said sleeve rolling-lobe flexible member having an end portion;
a connecting part;
a clamp ring for form tightly attaching said end portion to said connecting part so as to make the attachment pull tight and pressure tight;
said connecting part having an attachment slot formed to have a shape corresponding to a truncated cone when viewed in cross section;
said slot having a cylindrical base and first and second flanks ending in first and second upper edges;
said first flank being configured to be linearly conical with an opening angle ($\alpha$);
said clamp ring having an elevation ($H_S$) and said base having an elevation ($H_N$);
said elevation ($H_N$) of said base relative to said elevation ($H_S$) of said clamp ring lying in the range of −15% to +15% ($0.85 \leq H_N/H_S \leq 1.15$);
said clamp ring further having an inner surface running parallel to said base and an inner radius being equal to or less than at least one of the radii of one of said upper edges of said slot when said clamp ring is in the clamped-in state;
said sleeve rolling-lobe flexible member having a wall defining an unconstricted wall thickness (S);
said inner surface of said clamp ring and said base of said slot conjointly defining a distance therebetween corresponding substantially to said unconstricted wall thickness (S) of said flexible member so as to cause said flexible member to substantially retain said unconstricted wall thickness (S) over all of said elevation ($H_S$); and,
said clamp ring having a peripherally extending edge facing toward one of said flanks and said edge of said clamp ring and said at least one of said flanks conjointly defining a clamping constriction for fixedly clamping the wall of said flexible member at said end portion thereof so as to reduce a wall thickness of said flexible member at said constriction to be 30% to 75% of said unconstricted wall thickness (S) thereby preventing any significant longitudinal displacement and separation of said elastomeric material from said reinforcement.

2. The air spring of claim 1, wherein said opening angle ($\alpha$) is measured between a radius of said flexible member and at least one of said flanks and said opening angle lies in a range of 25° to 35° ($25° \leq \alpha \leq 35°$).

3. The air spring of claim 2, wherein said cylindrical base of said slot has a plurality of concentric recesses or concentric risers formed therein.

4. The air spring of claim 3, wherein said clamp ring has edges facing toward said cylindrical base and said edges are rounded and/or beveled.

5. The air spring of claim 4, wherein said flexible member is rolled up in advance of assembly so that, in the assembled state, the outer side of said end portion is in contact engagement with said cylindrical base of said slot while the inner side of said end portion contacts the inner side of said clamp ring.

6. The air spring of claim 1, wherein said linear conical flank is a smooth uninterrupted flank defining a smooth conical plane over its entire width with said opening angle ($\alpha$) being a constant angle over said entire width.

7. An air spring comprising:
a sleeve rolling-lobe flexible member made of elastomeric material and incorporating a reinforcement and said sleeve rolling-lobe flexible member having a first end portion and a second end portion;
a connecting part;
a first clamp ring for form tightly attaching said first end portion to said connecting part so as to make the attachment pull tight and pressure tight;
said connecting part having an attachment slot formed to have a shape corresponding to a truncated cone when viewed in cross section;
said slot having a cylindrical base and first and second flanks ending in first and second upper edges;
said first flank being configured to be linearly conical with an opening angle ($\alpha$);
said first clamp ring having an elevation ($H_S$) and said base having an elevation ($H_N$);
said elevation ($H_N$) of said base relative to said elevation ($H_S$) of said first clamp ring lying in the range of −15% to +15% ($0.85 \leq H_N/H_S \leq 1.15$);
said first clamp ring further having an inner surface running parallel to said base and an inner radius being equal to or less than at least one of the radii of one of said upper edges of said slot when said first clamp ring is in the clamped-in state;
said sleeve rolling-lobe flexible member having a wall defining an unconstricted wall thickness (S);
said inner surface of said first clamp ring and said base of said slot conjointly defining a distance therebetween corresponding substantially to said unconstricted wall thickness (S) of said flexible member so as to cause said flexible member to substantially retain said unconstricted wall thickness (S) over all of said elevation ($H_S$) of said clamp ring;
said first clamp ring having a peripherally extending edge facing toward one of said flanks and said edge and said at least one of said flanks conjointly defining a constriction for fixedly clamping the wall of said flexible member at said first end portion thereof so as to reduce a wall thickness of said flexible member at said constriction to be 30% to 75% of said unconstricted wall thickness (S) thereby preventing any significant longitudinal displacement and separation of said elastomeric material from said reinforcement;
said flexible member having an inside wall surface and an outside wall surface;
a roll-off piston having an attachment slot formed to have a shape corresponding to a truncated cone when viewed in cross section;
said slot of said roll-off piston having a cylindrical base and first and second flanks ending in first and second upper edges;
a second clamp ring for form tightly attaching said second end portion to said roll-off piston in said slot thereof; and,
said first end portion of said flexible member being attached to said connecting part so as to cause one of said wall surfaces to face toward said connecting part and said second end portion being connected to said roll-off piston so as to cause the other one of said wall surfaces to face toward said roll-off piston.

8. The air spring of claim 7, wherein said opening angle ($\alpha$) is measured between a radius of said flexible member and at least one of said flanks and said opening angle lies in a range of 25° to 35° ($25° \leq \alpha \leq 35°$).

9. The air spring of claim 8, wherein said cylindrical base of at least one of said slots has a plurality of concentric recesses or concentric risers formed therein.

10. The air spring of claim 9, wherein said first clamp ring has edges facing toward said cylindrical base and said edges are rounded and/or beveled.

11. The air spring of claim 7, wherein said linear conical flank is a smooth uninterrupted flank defining a smooth conical plane over its entire width with said opening angle ($\alpha$) being a constant angle over said entire width.

* * * * *

UNITED STATES PATENT AND TRADEMARK OFFICE
CERTIFICATE OF CORRECTION

PATENT NO. : 8,220,785 B2  Page 1 of 1
APPLICATION NO. : 11/791211
DATED : July 17, 2012
INVENTOR(S) : Christoph Bank, Paul Cerny and Hubertus Gawinski It is certified that error appears in the above-identified patent and that said Letters Patent is hereby corrected as shown below:

In column 4:
Line 30: delete "16$b$of" and substitute -- 16$b$ of --, therefor.

Line 58: delete "6$a$    Inner side of the rolling-lobe
flexible member 4".

Signed and Sealed this
Eleventh Day of September, 2012

David J. Kappos
*Director of the United States Patent and Trademark Office*